US010114597B2

(12) United States Patent
Hayashi

(10) Patent No.: US 10,114,597 B2
(45) Date of Patent: Oct. 30, 2018

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/690,077

(22) Filed: Aug. 29, 2017

(65) Prior Publication Data
US 2018/0060006 A1 Mar. 1, 2018

(30) Foreign Application Priority Data
Aug. 31, 2016 (JP) .................. 2016-169742

(51) Int. Cl.
| H04N 1/00 | (2006.01) |
| G06F 3/12 | (2006.01) |
| H04N 1/38 | (2006.01) |
| G06K 7/14 | (2006.01) |
| G06K 9/00 | (2006.01) |
| G06F 17/30 | (2006.01) |
| G06Q 10/08 | (2012.01) |

(52) U.S. Cl.
CPC .......... *G06F 3/1265* (2013.01); *G06F 3/1256* (2013.01); *G06F 3/1258* (2013.01); *G06F 3/1273* (2013.01); *G06K 7/1413* (2013.01); *H04N 1/38* (2013.01); *G06F 17/30011* (2013.01); *G06K 9/00483* (2013.01); *G06Q 10/083* (2013.01)

(58) Field of Classification Search
CPC .... G06F 3/1265; G06F 3/1256; G06F 3/1258; G06F 3/1273; G06F 17/30011; G06K 7/1413; G06K 9/00483; G06Q 10/083
See application file for complete search history.

(56) References Cited

U.S. PATENT DOCUMENTS

| 8,805,747 B2* | 8/2014 | Zimberoff | ............... H04L 63/10 705/330 |
| 2005/0237578 A1* | 10/2005 | Ikeda | ................... G06Q 10/087 358/302 |
| 2006/0071082 A1* | 4/2006 | Tamura | .................. B42D 15/02 235/487 |
| 2006/0165457 A1* | 7/2006 | Hasegawa | .............. G03B 27/46 400/62 |

(Continued)

FOREIGN PATENT DOCUMENTS

JP    11-079327 A    3/1999

*Primary Examiner* — Moustapha Diaby
(74) *Attorney, Agent, or Firm* — Canon U.S.A., Inc. IP Division

(57) ABSTRACT

An information processing device extracts a partial area corresponding to a newly placed printed product, from a captured image as a result of capturing an image of a predetermined image capturing area in which a printed product generated based on an order is placed, acquires from the table, slip information corresponding to image data obtained by searching the table for image data representing an image that matches or is similar to an image in the partial area, and generates print data of a slip corresponding to the newly placed printed product based on the acquired slip information.

9 Claims, 14 Drawing Sheets

(56) References Cited

U.S. PATENT DOCUMENTS

2011/0283578 A1* 11/2011 Engelby ............... G09F 3/0288
                                                          40/584
2012/0279409 A1* 11/2012 Aylward .................... B41J 3/01
                                                          101/483

* cited by examiner

FIG. 5

| Order_ID | Job_Name | Delivery_Name | Delivery_Address | Image_FilePath |
|---|---|---|---|---|
| Job_0000001189 | AQUARIUM Ticket | AAA | 1-1, XXX-Cho, YYY-Ku, ZZZ-Shi, 111-222, Japan | C:¥test¥images¥ticket.bmp |
| Job_0000001190 | Flyer A | BBB | 3-5-7, LLL, MMM-Ku, NNN, 999-0001, Japan | C:¥test¥images¥flyerA.bmp |
| Job_0000001189 | Campaign Postcard | AAA | 1-1, XXX-Cho, YYY-Ku, ZZZ-Shi, 111-222, Japan | C:¥test¥images¥postcard.bmp |
| Job_0000001190 | Flyer B | BBB | 3-5-7, LLL, MMM-Ku, NNN, 999-0001, Japan | C:¥test¥images¥flyerB.bmp |

FIG. 6

| Job ID | Job Name | Delivery Name | Delivery Address | Image FilePath | Image ID |
|---|---|---|---|---|---|
| Job_0000001189 | AQUARIUM Ticket | AAA | 1-1, XXX-Cho, YYY-Ku, ZZZ-Shi, 111-222, Japan | C:¥¥test¥images¥ticket.bmp | 100 |
| Job_0000001190 | Flyer A | BBB | 3-5-7, LLL, MMM-Ku, NNN, 999-0001, Japan | C:¥¥test¥images¥flyerA.bmp | 200 |
| Job_0000001189 | Campaign Postcard | AAA | 1-1, XXX-Cho, YYY-Ku, ZZZ-Shi, 111-222, Japan | C:¥¥test¥images¥postcard.bmp | 300 |
| Job_0000001190 | Flyer B | BBB | 3-5-7, LLL, MMM-Ku, NNN, 999-0001, Japan | C:¥¥test¥images¥flyerB.bmp | 400 |

| STATEMENT OF DELIVERY | | |
|---|---|---|
| JOB NO: | Job_0000001189 | 1401 |
| DELIVERY NAME: | AAA | 1402 |
| DELIVERY ADDRESS: | | |
| 1-1, XXX-Cho, YYY-Ku, ZZZ-Shi, 111-222, Japan | | 1403 |
| PRINTED PRODUCT: | | |
| NAME | QUANTITY | |
| AQUARIUM Ticket | 100 | 1404 |
| Campaign Postcard | 200 | 1405 |

1400

INFORMATION PROCESSING DEVICE, INFORMATION PROCESSING METHOD, AND STORAGE MEDIUM

BACKGROUND

Field of the Disclosure

The present disclosure relates to a technique for achieving efficient shipping operation of printed products for a print system.

Description of the Related Art

Conventionally, in the commercial printing industry, various types of printed products have been generated by combining an image forming device and a post-processing device. For example, a printed product obtained in print processing by the image forming device is set in the post-processing device to be subjected to post processing such as binding and cutting. Thus, printed products such as books, catalogs, flyers, tickets, and business cards can be generated with value added. The printed products thus generated are packed together with a statement of delivery and a delivery slip, and shipped. Japanese Patent Application Laid-Open No. 11-079327 discusses a technique in which, when an operator packs products to be shipped to the same delivery destination, specifications related to the content of a box of the products is output, by reading a barcode of the product in an inspection terminal.

The technique discussed in Japanese Patent Application Laid-Open No. 11-079327 requires the barcode to be attached to the products in advance. However, it might be difficult to attach the to the printed products such as flyers, tickets, and business cards, considering the design and a blank space of the printed products. Thus, the present applicant has developed a print system in which an image of printed products to be shipped is captured one by one in a shipping operation location to identify the products based on the captured images of the printed products, and identify the delivery destination of the products, and a slip is printed. However, this configuration of determining the delivery destination with the image of the printed products captured one by one leads to a cumbersome shipping operation when a plurality of printed products is to be shipped to the same destination because the printed products the images of which have been captured need to be temporarily put aside. Furthermore, such a configuration might require the operator to search for the printed products the images of which have been captured, when printed products with the captured images and printed products the images of which have not been captured yet are mixed.

SUMMARY

An information processing device according to an aspect of the present disclosure is configured to generate print data for a slip corresponding to a printed product generated based on an order, and includes a memory configured to store a table in which image data indicating an image formed on the printed product corresponding to the order and slip information indicating a content of the slip corresponding to the order are stored in association with each other, and a processor for executing a computer program to perform extracting a partial area corresponding to a newly placed, printed product from a captured image as a result of capturing an image of a predetermined image capturing area in which the printed product is placed, acquiring from the table, the slip information corresponding to image data obtained by similar image search executed to search the table for image data representing an image that matches or is similar to an image in the partial area, and generating print data of a slip corresponding to the newly placed, printed product based on the acquired slip information.

Further features of the present disclosure will become apparent from the following description of exemplary embodiments with reference to the attached drawings.

BRIEF DESCRIPTION OF THE DRAWINGS

FIG. 5 is a diagram illustrating an example of order information transferred from another information processing device to the information processing device, according to one or more embodiment of the subject disclosure.

FIG. 6 is a diagram illustrating an example of a table stored in an order information storage unit, according to one or more embodiment of the subject disclosure.

FIG. 13 is a diagram illustrating an example of a statement of delivery output based on print data generated by a print data generation unit, according to one or more embodiment of the subject disclosure.

DESCRIPTION OF THE EMBODIMENTS

An exemplary embodiment of the present disclosure is described below with reference to the drawings. A configuration of an information processing system according to the exemplary embodiment described below is merely an example, and the present disclosure is not limited to the following configuration.

Example of Configuration of Print System

Figure 1:
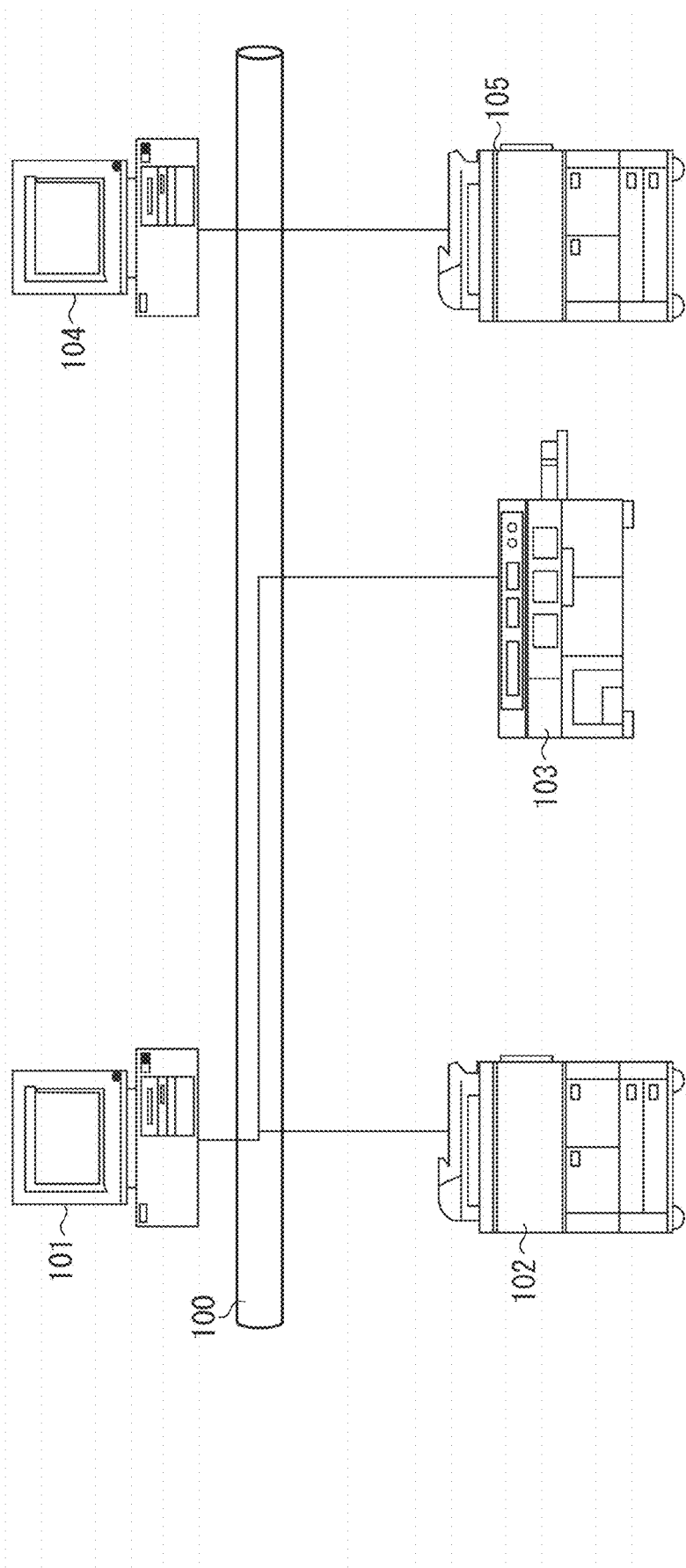
FIG. 1 is a diagram illustrating an overall configuration of an information processing system according to a first exemplary embodiment of the subject disclosure.

FIG. 1 is a diagram illustrating an overall configuration of an information processing system (hereinafter, referred to as a print system) according to a first exemplary embodiment. The print system according to the present exemplary embodiment illustrated in FIG. 1 includes an information processing device 101, an image forming device 102, a post-processing device 103, an information processing device 104, and an image forming device 105. The information processing device 101, the image forming device 102, the post-processing device 103, the information processing device 104, and the image forming device 105 are connected to each other through a network 100.

The image forming device 102 analyzes print data received from the information processing device 101, converts the print data into a dot image page by page, and performs printing. A printed product output from the image forming device 102 is manually conveyed to the post-processing device 103 by a print operator (hereinafter, also referred to as an operator) to the post-processing device 103, or is conveyed to the post-processing device 103 by a belt conveyer (not illustrated).

The post-processing device 103 can communicate with the image forming device 102 and the information processing device 101 through the network 100.

A program such as a job management program for managing printed product creation and a Web server operates on the information processing device 101. A program (printer driver) or the like for controlling the image forming device 102 is installed in the information processing device 101 through a network. The information processing device 101 transmits order information, related to the print data transmitted to the image forming device 102, to the information processing device 104. The order information is described in detail below with reference to FIG. 6.

A program, such as a shipment inspection program and a barcode reading program used in the shipping operation operates on the information processing device 104. Furthermore, a program (printer driver) for transferring print data to the image forming device 105, or the like is installed in the information processing device 104. The information processing device 104 analyzes the order information received from the information processing device 101, and generates print data for the image forming device 105 to print a document (e.g. a delivery slip and/or a statement of delivery) to be transmitted together with the printed product.

The image forming device 105 analyzes the print data received from the information processing device 104 or the like, converts the print data into dot images page by page, and performs the printing. The printed document output from the image forming device 105 is packed or attached together with the printed product output from the image forming device 102 by the print operator and shipped.

In the example illustrated in FIG. 1, the information processing device 101, the image forming device 102, the post-processing device 103, the information processing device 104, and the image forming device 105 are each illustrated as a single device. It is to be noted that the number of each device may be any number. Furthermore, the print system may not include the information processing device 104. For example, the program, such as the shipment inspection program and the barcode reading program, may operate on the information processing device 101. For example, the printer driver, for transferring print data to the image forming device 105, or the like may be installed in the information processing device 101. The network 100 may be the Internet. For example, a configuration where the information processing device 101 accesses the image forming device 102, the post-processing device 103, and the image forming device 105 over the Internet may be employed.

Hardware Configuration of Print System

Figure 2:
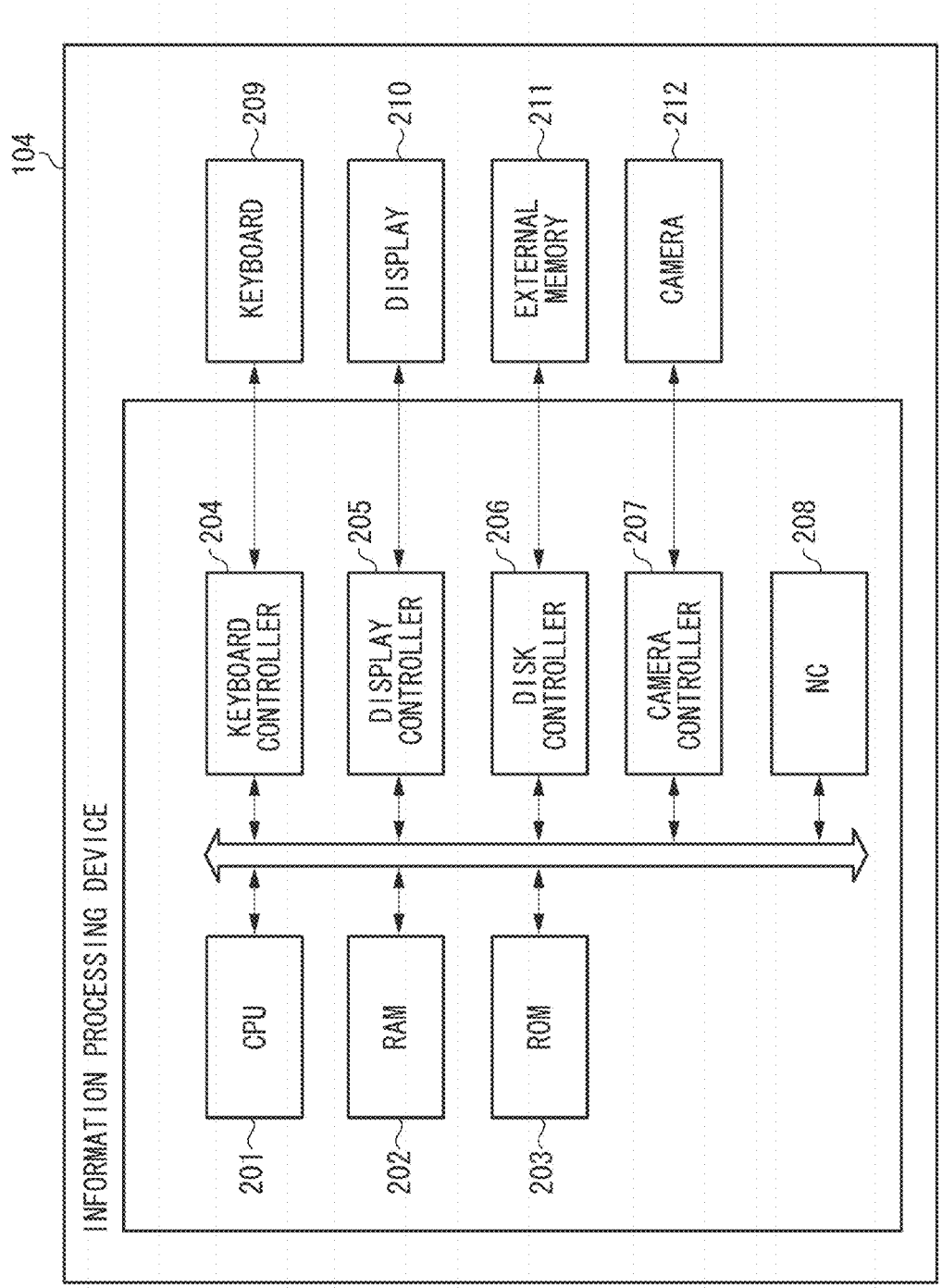
FIG. 2 is a block diagram illustrating an example of a hardware configuration of an information processing device, according to one or more embodiment of the subject disclosure.

FIG. 2 is a block diagram illustrating an example of a hardware configuration of the information processing device 104. The information processing device 104 may be implemented with the hardware of a general personal computer (PC).

A central processing unit (CPU) 201 illustrated in FIG. 2 executes a program stored in a read only memory (ROM) within a program ROM 203. The CPU 201 executes a program such as an Operation System (OS) and an application program loaded onto a random access memory (RAM) 202 from a hard disk. Functional blocks that execute processing illustrated in each flowchart described below, perform an operation when the CPU 201 executes the program stored in the readable storage medium as described above. The RAM 202 is a main memory for the CPU 201, and functions as a work area. A keyboard controller 204 controls input from a keyboard 209, a barcode reader (not illustrated), and a pointing device (such as a mouse, a touch pad, a touch panel, a trackball, and the like) (not illustrated). A display controller 205 controls what is presented on a display 210. A disk controller 206 controls data access to an external memory 211 such as a hard disk (HD) and a flexible disk (FD) that store various types of data. A camera controller 207 controls an input of captured image data from a camera 212. A network controller (NC) 208 is connected to a network, and controls communications with other devices connected to the network.

Example of Software Configuration of Print System

Figure 3:
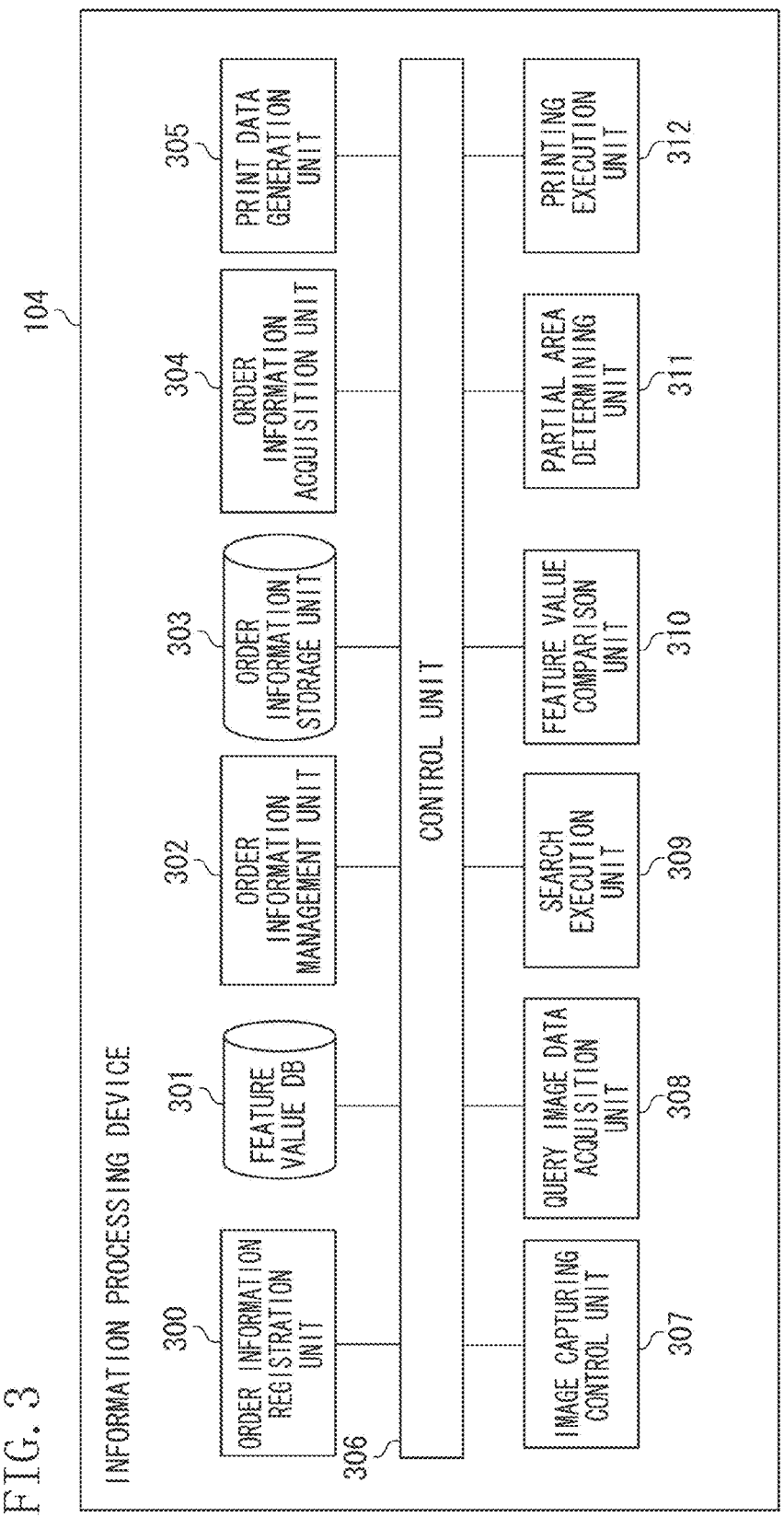
FIG. 3 is a functional block diagram illustrating functional blocks of the information processing device, according to one or more embodiment of the subject disclosure.

FIG. 3 is a block diagram illustrating functional blocks of the information processing device 104. A control unit 306 controls the other functional blocks of the information processing device 104. An order information registration unit 300 controls registering of order information illustrated in FIG. 6 in the information processing device 104. More specifically, the order information registration unit 300 analyzes the order information received from the information processing device 101 row by row, and transfers an analysis result on each row to the control unit 306. This analysis result includes a file path to an image file as print data corresponding to the printed product, stored in a file format such as Bitmap and Joint Photographic Experts Group (JPEG), and a delivery destination of the printed product. The control unit 306 acquires a file path to an image file as the analysis result, and acquires the image file based on the file path. The control unit 306 registers the acquired image file in a feature value database (DB) 301. In this process, the feature value DB 301 calculates a feature value of the registered image file, and transfers the feature value and an image identification (ID) corresponding to the image file to the control unit 306. The control unit 306 transfers the image ID and the feature value received from the feature value DB 301, as well as the analysis result to an order information management unit 302. The order information management unit 302 manages order information. More specifically, the order information management unit 302 receives the analysis result of the order information from the control unit 306, and stores the analysis result in an order information storage unit 303. The order information management unit 302 acquires order information corresponding to the image ID designated by the control unit 306 from the order information storage unit 303, and transfers the order information to the control unit 306. The order information storage unit 303 stores the order information and the analysis result of the order information. For example, the order information storage unit 303 may be implemented by the RAM 202 or the external memory 211. Alternatively, the order information storage unit 303 may be implemented using a data storage program such as a database. An image capturing control unit 307 controls the camera 212 to capture an image of the printed product, and generates a captured image file. The captured image file may be generated in a file format such as Bitmap or JPEG, or generated as image data to be stored in the RAM 202. Upon receiving an instruction from the control unit 306, a search execution unit 309 uses query image data to search the feature value DB 301 (similar image search) and transfers a search result to the control unit 306. The search result includes a feature value of query image data, a list of image IDs of registered images related to the query image data, and a list of feature values of the registered images related to the query image data. In the present exemplary embodiment, the order of the list of image IDs matches with the order of the list of feature values. The closer to a top of the lists, the higher the similarity between the registered image and the query image data. An order information acquisition unit 304 acquires the image ID at the top of the list of image IDs received by the control unit 306 as the search result. The order information acquisition unit 304 requests the control unit 306 to acquire order information including the image ID matching the acquired image ID from the order information storage unit 303. A feature value comparison unit 310 compares feature values received from the control unit 306 with each other and determines whether the received values match with each other. A partial area determining unit 311 identifies an area where the feature value comparison unit 310 determines that the feature values match with each other, from the image data. A query image data acquisition unit 308 executes trimming for the partial area identified by the partial area determining unit 311 to generate new query image data. A print data generation unit 305 generates print data based on the order information acquired by the order information acquisition unit 304. A printing execution unit 312 controls printing of print data by transmitting the print data generated by the print data generation unit 305, to the image forming device 105.

Example of Printed Product Generated in Print System

Figure 4:
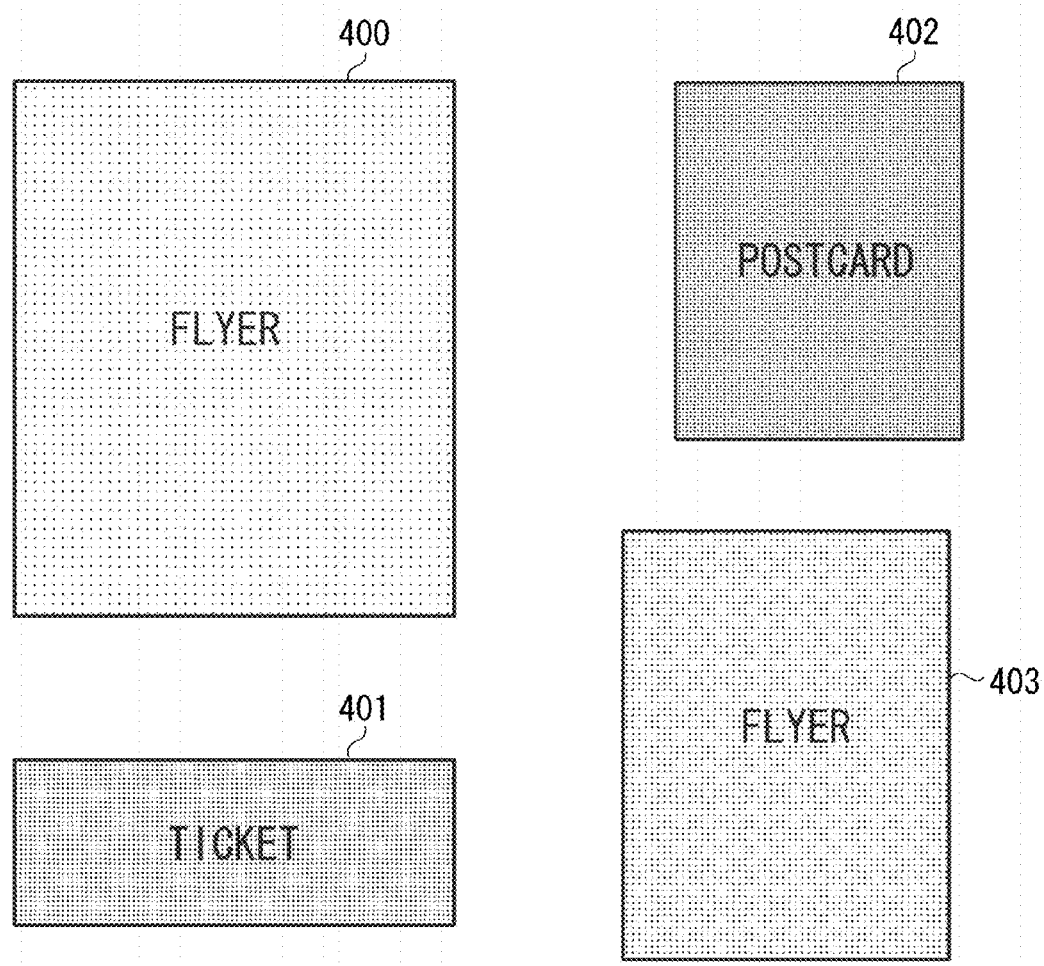
FIG. 4 is a diagram illustrating an example of printed products generated in the information processing system according to the first exemplary embodiment.

FIG. 4 is a diagram illustrating an example of the printed products generated in the print system according to the first exemplary embodiment.

A printed product 400 and a printed product 403 are flyers. The printed product 400 and the printed product 403 are different from each other in a size and in print data to be printed on a sheet of paper. A printed product 401 is a ticket. A printed product 402 is a campaign postcard such as a direct mail. The information processing device 101 generates image data corresponding to print data of each of the printed products 400 to 403 illustrated in FIG. 4, based on the print data. The image data is registered as the image files in the feature value DB 301 of the information processing device 104.

Registered Image and Order Information Registered in Information Processing Device FIG. 5 is a diagram illustrating an example of the order information transferred from the information processing device 101 to the information processing device 104. A column 601 stores order IDs for identifying orders in the order information. A column 602 stores job names of the orders. A column 603 stores delivery names of the orders. A column 604 stores delivery addresses of the orders. A column 605 stores file paths (image file path) to image files respectively associated with the orders. File paths 606 to 609 in the column 605 each correspond to an image file generated based on the print data of the printed products 400 to 403 illustrated in FIG. 4. More specifically, the file path 606 corresponds to the image file generated based on the print data of the printed product 401. The file path 607 corresponds to the image data generated based on the print data of the printed product 400. The file path 608 corresponds to the image data generated based on the print data of the printed product 402. The file path 609 corresponds to the image data generated based on the print data of the printed product 403. Thus, for example, the printed product 400 (flyerA), the image file (flyerA.bmp) generated based on the print data of the printed product 400, and the file path 607 are associated with each other.

When the printed product is a booklet including a plurality of pages, an image file corresponding to an image to be printed on a cover may be generated, and a path to the image file may be stored in the order information.

Data Stored in Order Information Storage Unit of Information Processing Device FIG. 6 is a diagram illustrating an example of a table stored in the order information storage unit 303. Columns 701 to 705 respectively correspond to the columns 601 to 605 of the order information illustrated in FIG. 6. A column 706 stores an image ID which is acquired when an image file acquired with a file path in the column 705 is registered in the feature value DB.

Flow of Registering Order Information in Information Processing Device

Figure 7:
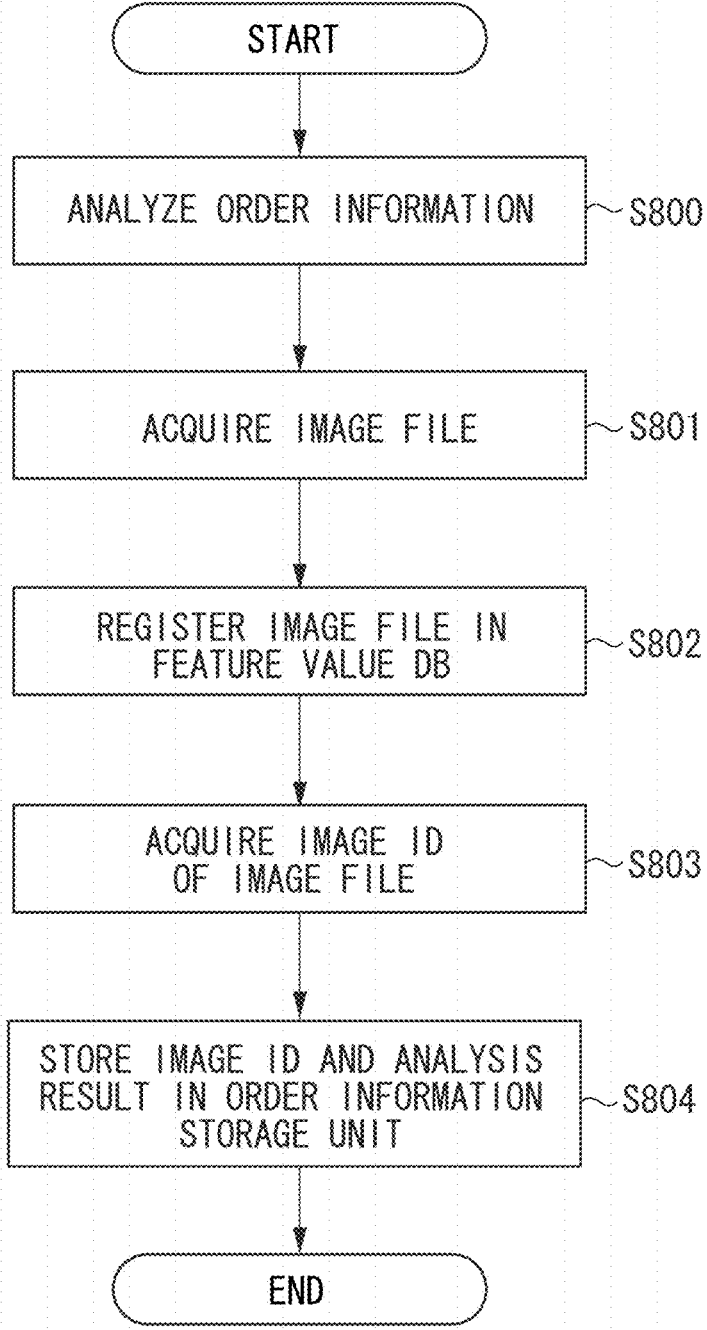
FIG. 7 is a flowchart illustrating processing executed by the information processing device to register order information in the order information storage unit, according to one or more embodiment of the subject disclosure.

FIG. 7 is a flowchart illustrating processing executed by the information processing device 104 to register order information in the order information storage unit 303. A program corresponding to the flow in FIG. 7 is stored in the ROM 203 of the information processing device 104, and is loaded onto the RAM 202 to be executed by the CPU 201.

In step S800, the order information registration unit 300 of the information processing device 104 analyzes the order information received from the information processing device 101 row by row. The order information registration unit 300 transfers the analysis result of each row to the control unit 306. This analysis result is a result of analysis on one order (one row) in the order information illustrated in FIG. 5.

In step S801, the control unit 306 acquires a file path to an image file from the analysis result. Then, the control unit 306 acquires the image file based on the file path.

In step S802, the control unit 306 registers the image file acquired in the feature value DB 301. The feature value DB 301 transfers the image ID and the feature value corresponding to the registered image file, to the control unit 306 as a response.

In step S803, the control unit 306 acquires the image ID and the feature value received from the feature value DB 301. Then, the control unit 306 transfers the image ID and the analysis result to the order information registration unit 300.

In step S804, the order information registration unit 300 issues a request to store the image ID and the analysis result in the order information storage unit 303 to the order information management unit 302 via the control unit 306. Upon receiving the request from the order information registration unit 300, the order information management unit 302 stores the analysis result and the image ID in the order information storage unit 303 in association with each other.

Example of Captured Image of Printed Product in Print System

Figure 8:
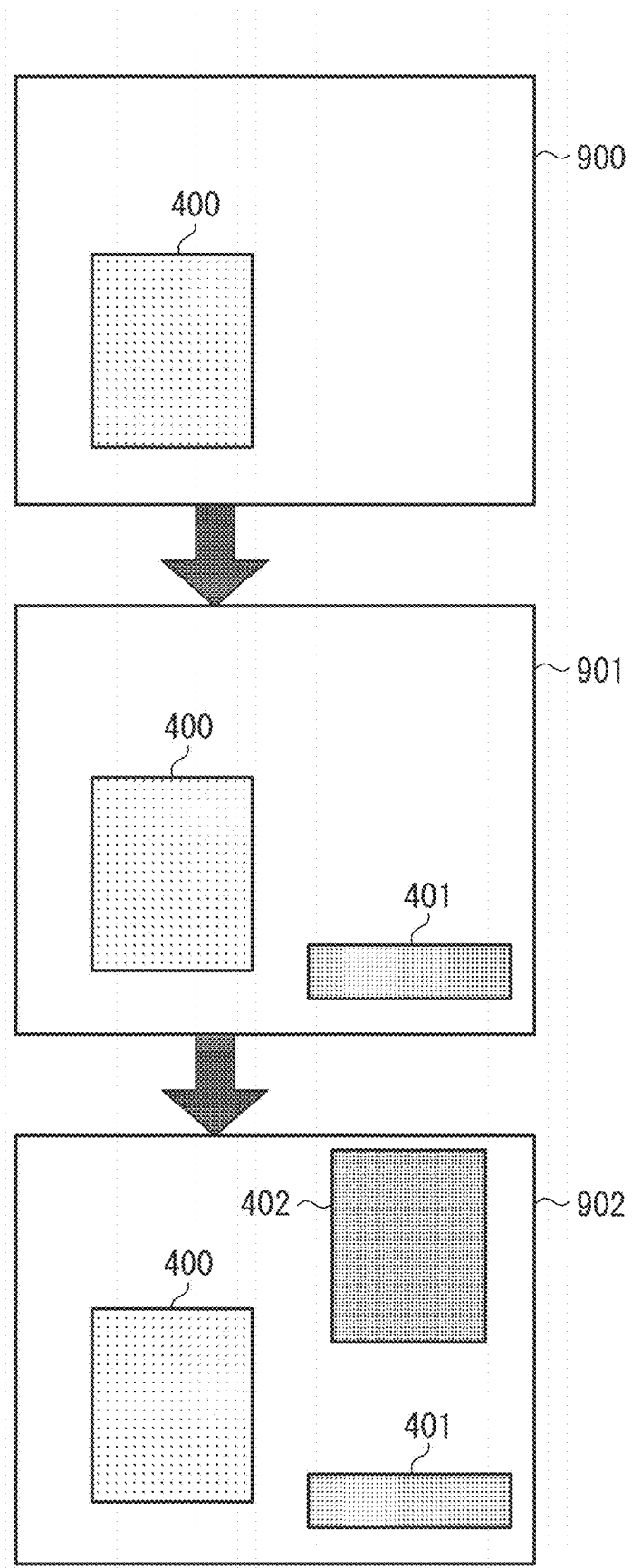
FIG. 8 is a diagram illustrating an example of captured images of printed products acquired with an image capturing control unit, according to one or more embodiment of the subject disclosure.

FIG. 8 is a diagram illustrating an example of a captured image of a printed product acquired by the image capturing control unit 307.

A captured image 900 represents a first image capturing result. The captured image 900 only includes the printed product 400. A captured image 901 represents a second image capturing result. The captured image 901 includes the printed product 400 and the printed product 401. The position of the printed product 400 has not changed from that in the captured image 900. In other words, the printed product 400 remains in place. A captured image 902 represents a third image capturing result. The captured image 902 includes the printed product 400, the printed product 401, and the printed product 402. The positions of the printed product 400 and the printed product 401 have not changed from those in the captured image 901. Thus, the printed products 400 and 401 remains in place. The captured image data corresponding to each of the captured images 900 to 902 is processed by the information processing device 104.

Flow of Image Capturing Processing in Information Processing Device

Figure 9:
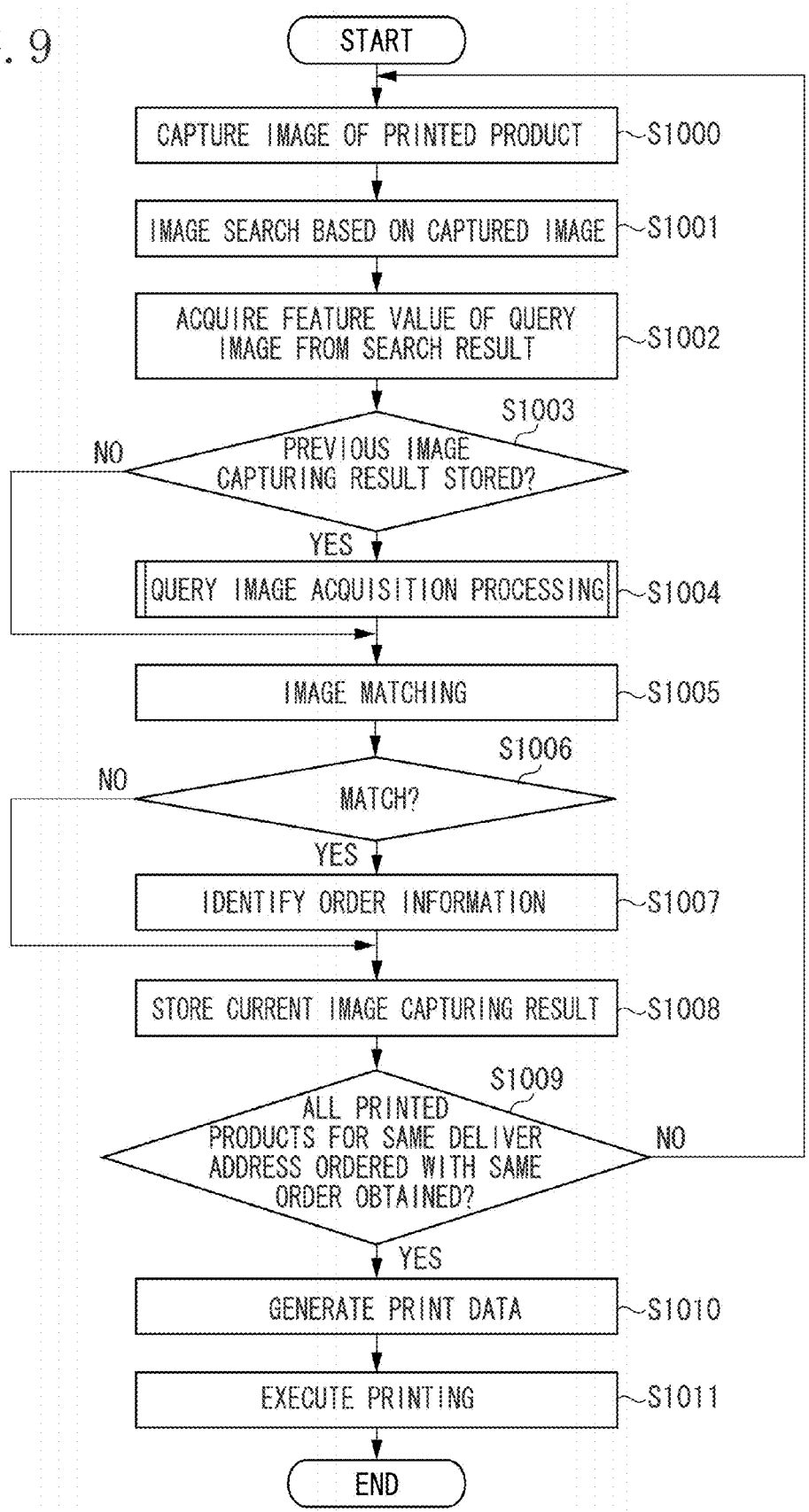
FIG. 9 is a flowchart illustrating processing, from image capturing of a printed product to issuing a print instruction to an image forming device, executed by the information processing device, according to one or more embodiment of the subject disclosure.

FIG. 9 is a flowchart illustrating processing from capturing an image of a printed product to issuing a printing execution instruction to the image forming device 105, executed by the information processing device 104. A program corresponding to the flow in FIG. 9 is stored in the ROM 203 of the information processing device 104, and is loaded on the RAM 202 to be executed by the CPU 201.

In the present exemplary embodiment, the print operator places the printed product after post processing (such as binding) by the post-processing device 103 on a predetermined image capturing area, and issues an image capturing instruction to the image capturing control unit 307. Thus, the processing in FIG. 9 starts.

In step S1000, the image capturing control unit 307 captures an image of the printed product to generate captured image data.

In step S1001, the search execution unit 309 executes similar image search on the feature value DB 301, by using an image represented by the generated, captured image data as a query image. The search execution unit 309 receives the search result from the feature value DB 301, and transfers the search result to the control unit 306. When a print operator places a plurality of the printed products in the predetermined image capturing area, the search result for each of the printed products is transferred to the control unit 306.

In step S1002, the control unit 306 acquires a feature value of the query image from the search result received from the search execution unit 309. A current image capturing result is obtained as a combination of the query image and the feature value of the query image.

In step S1003, the control unit 306 determines whether a previous image capturing result is stored in the RAM 202. When the control unit 306 determines that the previous image capturing result is stored (YES in step S1003), the processing proceeds to step S1004. On the other hand, when the previous image capturing result is not stored (NO in step S1003), the processing proceeds to step S1005.

In step S1004, the control unit 306 controls the feature value comparison unit 310, the query image data acquisition unit 308, and the search execution unit 309 to execute query image acquisition processing described below. In the query image acquisition processing, the list of image IDs is acquired from the feature value DB 301. The list of image IDs is a part of the result of searching for a similar image corresponding to the newly generated query image data.

In step S1005, the order information management unit 302 acquires the image ID at the top of the list of image IDs. In this process, the list of image IDs included in the result of the similar image search in step S1001 is acquired in a case where the processing in step S1004 has been skipped. The order information management unit 302 uses the image ID as a matching target ID to execute matching against the order information stored in the order information storage unit 303.

In step S1006, the order information management unit 302 determines whether as a result of the matching, the column 706 includes an image ID coinciding with the matching target ID. When there is the matching image ID (YES in step S1006), the processing proceeds to step S1007. On the other hand, when there is no matching image ID (NO in step S1006), the processing proceeds to step S1008.

In step S1007, the order information management unit 302 identifies the order information including the image ID coinciding with the matching target ID from the information stored in the order information storage unit 303. The order information management unit 302 transfers the identified order information to the control unit 306.

In step S1008, the control unit 306 stores the current image capturing result (the query image and the feature value of the query image) in the RAM 202.

In step S1009, the control unit 306 determines whether all the printed products to be delivered to the same delivery destination indicated in the same order have been obtained. When all the printed products have been obtained (YES in step S1009), the processing proceeds to step S1010. On the other hand, when not all the printed products have been yet obtained (NO in step S1009), the processing returns to step S1000. When there is a plurality of groups of printed products to be delivered to the same delivery destination as illustrated in the example of FIG. 5 (a group of first and third rows and a group of second and fourth rows), the processing proceeds to step S1010 after the printed products of all the groups have been obtained.

In step S1010, the print data generation unit 305 generates print data (for a statement of delivery) based on the order information identified in step S1007.

In step S1011, the printing execution unit 312 transmits the print data thus generated to the image forming device 105.

Figure 10:
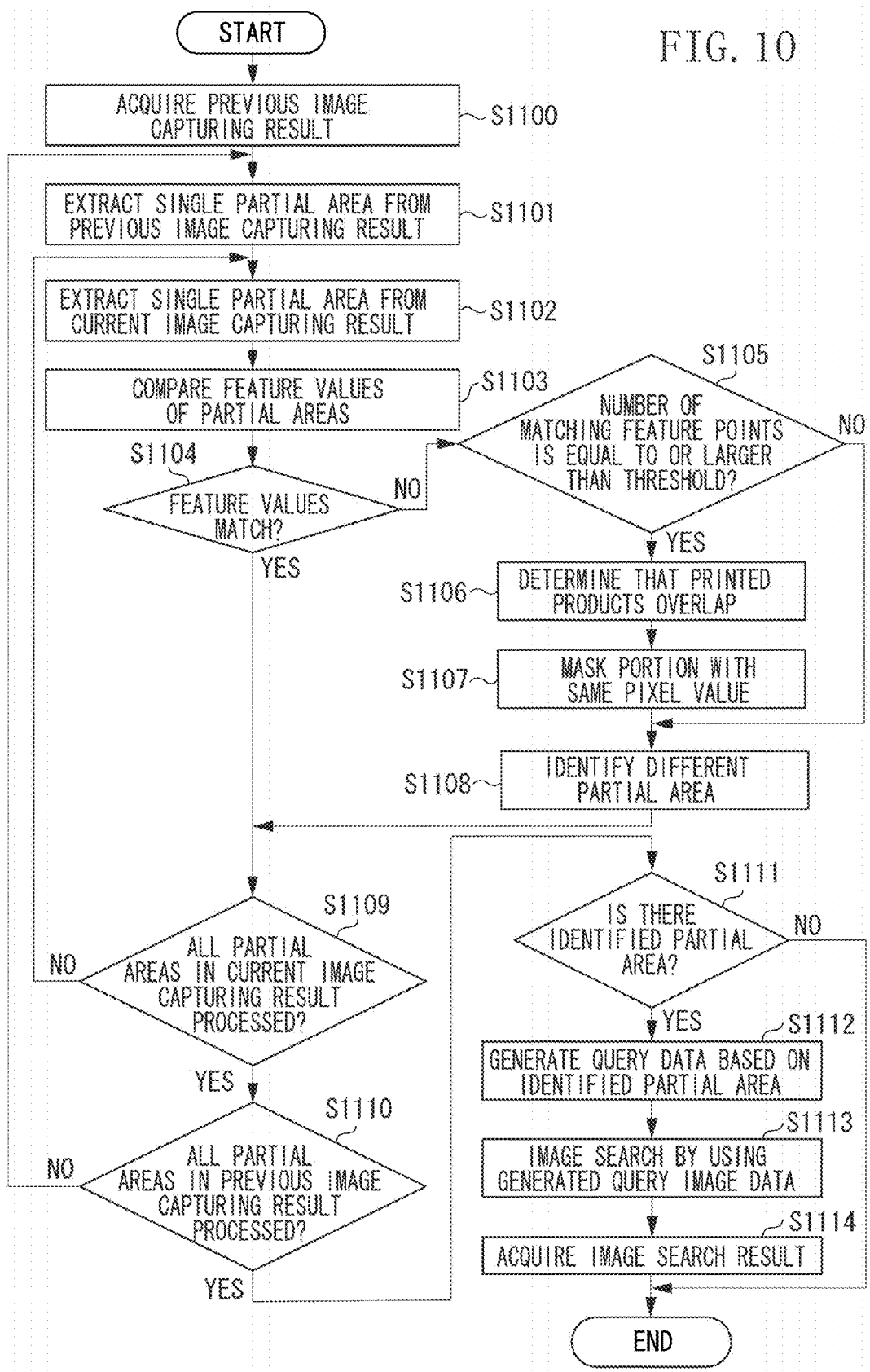
FIG. 10 is a flowchart illustrating a flow of query image acquisition processing in step 51004, according to one or more embodiment of the subject disclosure.

Flow of Processing for Acquiring Query Image Corresponding to Captured Image in Information Processing Device FIG. 10 is a flowchart illustrating a flow of the query image acquisition processing in step S1004. A program corresponding to the flow in FIG. 10 is stored in the ROM 203 of the information processing device 104, and is loaded on the RAM 202 to be executed by the CPU 201.

In step S1100, the control unit 306 acquires the previous image capturing result from the RAM 202.

In step S1101, the feature value comparison unit 310 extracts one partial area from the previous image capturing result. The partial area is an area corresponding to the printed product extracted from the image capturing result (captured image data). The partial area serves as a reference of feature value comparison processing executed in a later step.

In step S1102, the feature value comparison unit 310 extracts one partial area from the current image capturing result obtained by the control unit 306 in step S1002.

In step S1103, the feature value comparison unit 310 compares the feature values of the partial areas extracted in steps S1101 and S1102.

In step S1104, the feature value comparison unit 310 determines whether a result of the comparison in step S1103 indicates that the feature values match with each other. When the feature values match with each other (YES in step S1104), the processing proceeds to step S1109. On the other hand, when the feature values do not match (NO in step S1104), the processing proceeds to step S1105.

When the result of the comparison in step S1103 indicates that the feature values match (YES in step S1104) with each other, the processing proceeds to step S1109. In step S1109, the feature value comparison unit 310 determines whether all the partial areas included in the current image capturing result have been processed, that is, whether all the partial areas corresponding to the printed products placed in the predetermined image capturing area have been processed. When all the partial areas have been processed (YES in step S1109), the processing proceeds to step S1110. On the other hand, when not all the partial areas have been yet processed (NO in step S1109), the processing proceeds to step S1102.

In step S1110, the feature value comparison unit 310 determines whether all the partial areas in the previous image capturing result have been processed. When all the partial areas have been processed (YES in step S1110), the processing proceeds to step S1111. On the other hand, when not all the partial areas have been processed (NO in step S1110), the processing proceeds to step S1101.

In step S1111, the control unit 306 determines whether there is a partial area identified by the partial area determining unit 311. When there is the identified partial area (YES in step S1111), the processing proceeds to step S1112. On the other hand, when there is no identified partial area (NO in step S1111), the query image acquisition processing is terminated.

In step S1112, the query image data acquisition unit 308 generates new query image data based on the partial area identified by the partial area determining unit 311.

In step S1113, the search execution unit 309 executes the similar image search by using the newly generated query image data.

In step S1114, the control unit 306 acquires a search result of the similar image search executed in step S1113. The control unit 306 acquires a list of image IDs from the search result.

When the result of the comparison in step S1103 indicates that the feature values do no match with each other (NO in step S1104), the processing proceeds to step S1105.

In step S1105, the feature value comparison unit 310 determines whether the number of matching feature points in the partial areas, the feature values of which have been compared in step S1103, is equal to or larger than a threshold. For example, the feature value comparison unit 310 compares the feature points between the partial areas and counts the number of the feature points which show the same feature values to determine whether the resultant number is equal to or larger than the threshold. When the number of matching feature points is equal to or larger than the threshold (YES in step S1105), the processing proceeds to step S1106. On the other hand, when the number of matching feature points is smaller than the threshold (NO in step S1105), the processing proceeds to step S1108. The threshold used in step S1105 is stored in a storage unit (not illustrated) of the information processing device 104 or the like in advance.

In step S1106, the feature value comparison unit 310 determines that the printed products overlap with each other in the compared partial areas.

In step S1107, the partial area determining unit 311 executes mask processing to mask an area of the current captured image data that has the same pixel position and pixel value as the previous captured image data, in the compared partial areas.

In step S1108, the partial area determining unit 311 identifies a partial area in the current captured image data that is different from the previous captured image data. Information (for example, coordinates) about the partial area thus identified is temporarily stored in the RAM 202.

Figure 11A:
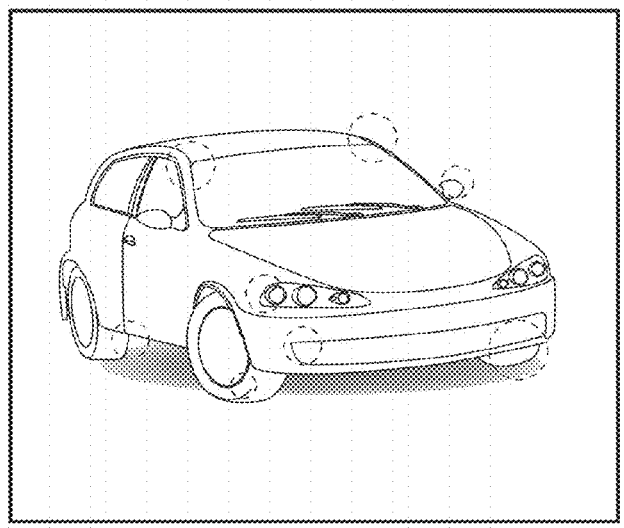
FIGS. 11A and 11B are each schematic views for describing the query image acquisition processing. according to one or more embodiment of the subject disclosure.
Figure 11B:
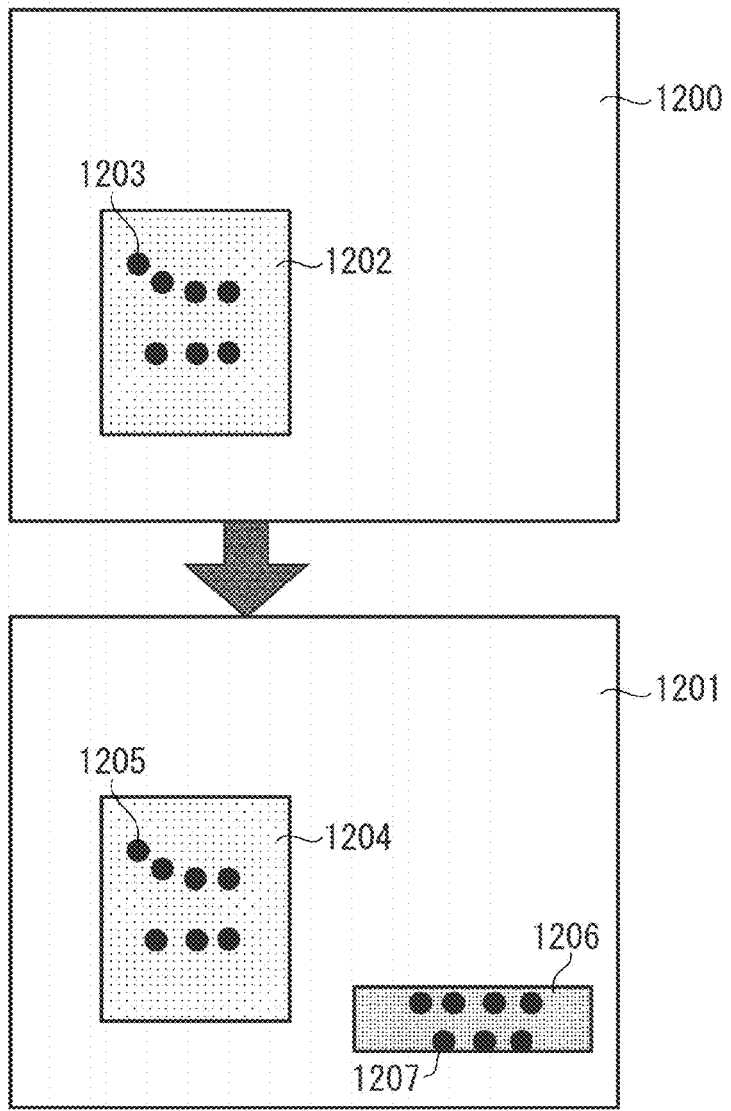

The flow of the query image acquisition processing is described with reference to an example illustrated in FIG. 11. FIG. 11 is a schematic view illustrating the query image acquisition processing. FIG. 11A illustrates an example of a captured image of an automobile. Dotted circle marks in FIG. 11A each represent a position (the center position of the circle mark) where the feature point is extracted. The size of the circle mark represents a size of the area (feature value calculation area) for calculating the feature value of the feature point. In the example illustrated in FIG. 11A, points at sharp portions in the image are extracted as the feature points. Whether images match with each other (or are similar to each other) can be determined by comparing the number of the feature points and the feature values of the feature points between the images. In the present exemplary embodiment, a small area (feature value calculation area) surrounding the feature point is divided into 4×4 blocks. Concentration gradients in eight directions are calculated for each block as the feature value of the feature point. The feature value may be calculated in any other ways. Instead of the sharp portion, another element (for example, an edge) may be extracted as the feature point. Thus, any element that can be used for the similar image search may be used as the feature point. FIG. 11B illustrates an example of a captured image of printed products that are placed in such a manner that they do not overlap with each other. A captured image 1200 corresponds to the previous captured image data whereas a captured image 1201 corresponds to the current captured image data. Each black circle in the captured images 1200 and 1201 represents the feature point extracted at the illustrated position.

First, in step S1101, a partial area 1202 is extracted from the captured image 1200. The partial area 1202 corresponds to the printed product 400 (Flyer A). The partial area 1202 includes a feature point 1203 (the seven black circles in the figure are collectively referred to as the feature point 1203). Then, in step S1102, a partial area 1204 is extracted from the captured image 1201. The partial area 1204 corresponds to the printed product 401 (Aquarium Ticket). The partial area 1204 includes a feature point 1205 (the seven black circles in the figure are collectively referred to as the feature point 1205). Then, in step S1103, the feature point 1203 in the partial area 1202 is compared with the feature point 1205 in the partial area 1204. Then, in step S1104, whether the feature values match between the feature point 1203 and the feature point 1205 is determined. More specifically, it is determined whether the feature value of each black circle (feature point) as the feature point 1205, and the feature value of the corresponding black circle (feature point) as the feature point 1203 match with each other. In the example illustrated in FIG. 11, the feature values match between the feature point 1203 and the feature point 1205 (YES in step S1104), and thus the processing proceeds to step S1109. At this point, a partial area 1206 of the captured image 1201 is yet to be processed (NO in step S1109), and thus the processing returns to step S1102. Then, step S1102 is executed again to extract the partial area 1206 from the captured image 1201. The partial area 1206 includes a feature point 1207 (the seven black circles in the figure are collectively referred to as the feature point 1207). Then, in step S1103, the feature point 1203 in the partial area 1202 is compared with the feature point 1207 in the partial area 1206. The feature point 1203 and the feature point 1207 are different from each other in the feature value (NO in step S1104), and thus the processing proceeds to step S1105.

Figure 12:
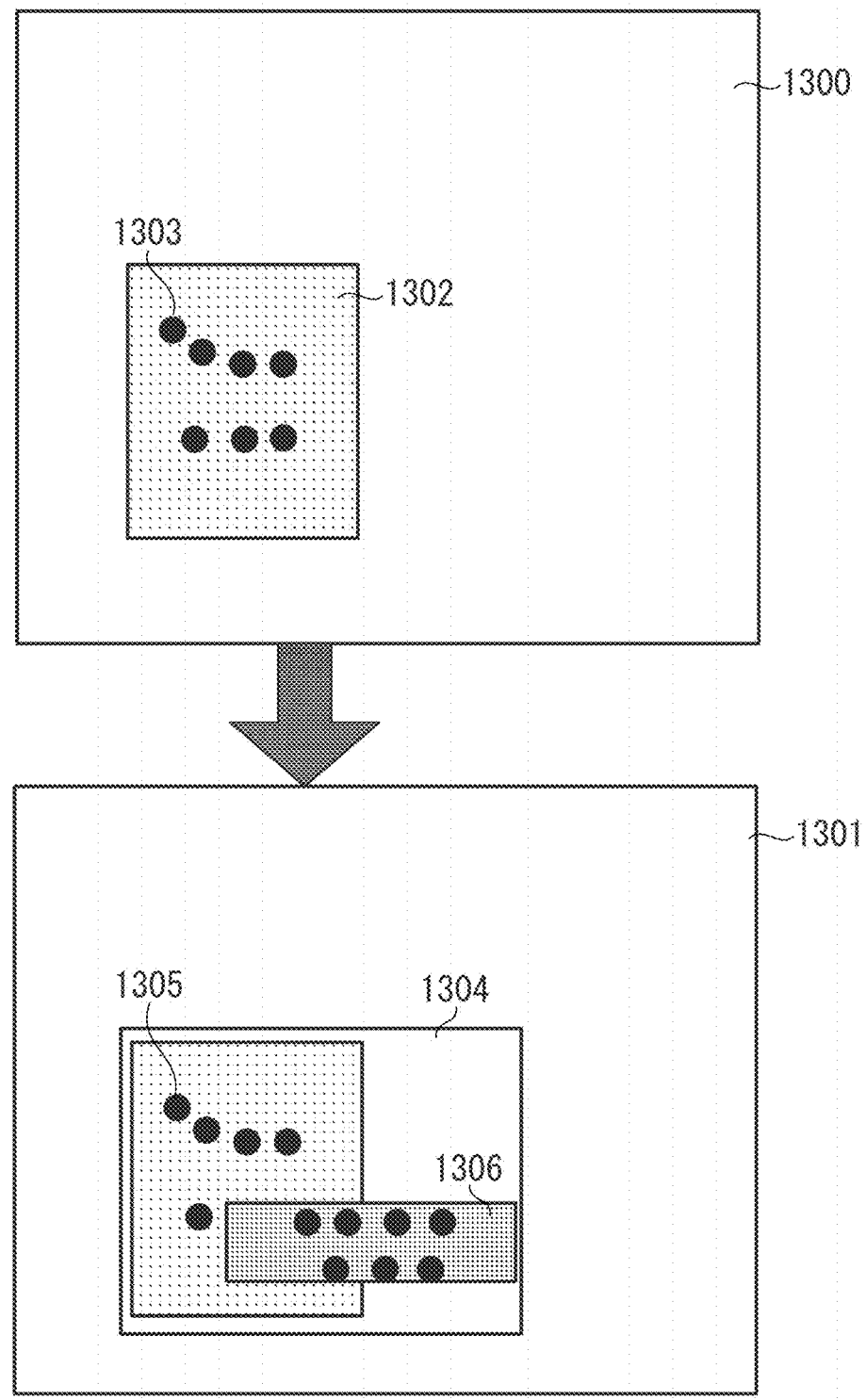
FIG. 12 is a diagram illustrating an example of captured images of printed products that are placed to overlap with each other, according to one or more embodiment of the subject disclosure.

A flow of the query image acquisition processing executed when printed products illustrated in FIG. 12 are shipped will be described. FIG. 12 is a diagram illustrating an example of captured images of the printed products that are placed to overlap with each other. A captured image 1300 corresponds to the previous captured image data whereas a captured image 1301 corresponds to the current captured image data.

First, in step S1101, a partial area 1302 is extracted from the captured image 1300. The partial area 1302 corresponds to the printed product 400 (Flyer A). The partial area 1302 includes a feature point 1303 of the Flyer A (the seven black circles in the figure are collectively referred to as the feature point 1303). Then, in step S1102, a partial area 1304 is extracted from the captured image 1301. The partial area 1304 is an area corresponding to the printed product 400 (Flyer A) and the printed product 401 (Aquarium Ticket) that are placed to overlap with each other. The partial area 1304 includes a feature point 1305 of the Flyer A (the five black circles in the figure are collectively referred to as the feature point 1305) and a feature point 1306 of the Aquarium Ticket (the seven black circles in the figure are collectively referred to as the feature point 1306). The number of the feature points (black circles) in the Flyer A is essentially seven but two of the black circles are hidden by the Aquarium Ticket. Thus, five black circles are illustrated in the example illustrated in FIG. 12. In step S1103, the feature point 1303 in the partial area 1302 is compared with a feature point of the partial area 1304 (the twelve black circles in the figure are collectively referred to as the feature point in the partial area 1304). In step S1104, it is determined whether the feature values match between the feature point 1303 in the partial area 1302 and the feature point in the partial area 1304. In the example illustrated in FIG. 12, the feature values do not match with each other (NO in step S1104), and thus the processing proceeds to step S1105. In step S1105, the number of the feature points included in the partial area 1304 that match the feature point 1303 is determined. In the example illustrated in FIG. 12, five feature points within the partial area 1304 match the feature point 1303. Thus, for example, when the threshold is set to be four, it is determined that the printed products overlap with each other in the partial area 1304 in step S1106. Therefore, it is determined that the partial area different from that in the previous captured image data cannot be accurately identified. Then, in step S1107, a portion other than that corresponding to the printed product 401 is masked because the pixel values would be the same. The mask processing is not executed when the number of the matching feature points is smaller than the threshold because a similar image search in step S1113 can be executed without problem (an appropriate search result can be obtained in step S1113) even without execution of the mask processing.

In the description above, a case where the printed product is added one by one is taken as an example to simplify the description. However, a plurality of printed products may be added at a time. In such a case, in step S1112, a plurality of query images corresponding to the plurality of added print products is generated. Then, in step S1113, the similar image search is executed based on each of the query images thus generated. Then, in step S1114, the image ID is acquired each time the similar image search is executed.

Example of Print Data in Information Processing Device

FIG. 13 is a diagram illustrating an example of a statement of delivery output based on print data generated by the print data generation unit 305.

A statement of delivery 1400 includes job number (job No.) 1401, delivery name 1402, delivery address 1403, and information (name information and quantity information) about each printed product 1404-1405. In the present exemplary embodiment, the order information acquisition unit 304 acquires the order information identified by the order information management unit 302. Then, the print data generation unit 305 extracts slip information for outputting the statement of delivery and a delivery slip from the order information, and generates print data of the statement of delivery and the delivery slip based on the slip information. The items in the statement of delivery 1400 correspond to items of the columns in the order information storage unit 303. More specifically, the job number 1401 corresponds to the column 701, the delivery name 1402 corresponds to the column 703, the delivery address 1403 corresponds to the column 704, and the name information about each printed product 1404-1405 corresponds to the column 702.

Figure 14:
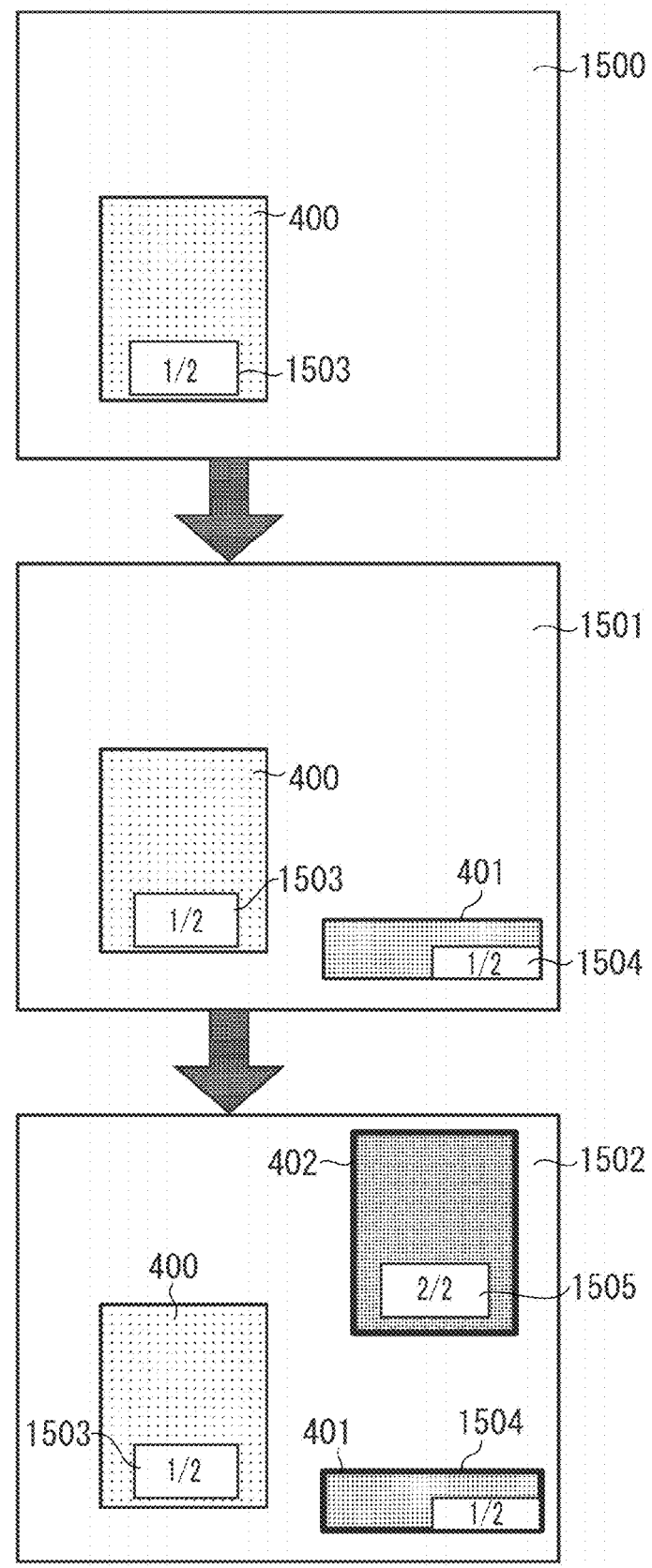
FIG. 14 is a diagram illustrating a display example on a display device, according to one or more embodiment of the subject disclosure.

Example of Display on Information Processing Device When Image of Printed Product is Captured FIG. 14 is a diagram illustrating a display example on the display 210. In the present exemplary embodiment, the control unit 306 performs display control for the display 210. For example, the control unit 306 uses the image file generated by the image capturing control unit 307 to generate display data for achieving the display illustrated in FIG. 14, and outputs the display data to the display 210 via the display controller 205.

A display example 1500 represents a display example displayed at the time of the first image capturing, and includes the printed product 400. A display example 1501 represents a display example displayed at the time of the second image capturing, and presents the printed product 400 and the printed product 401. A display example 1502 represents a display example displayed at the time of the third image capturing, and presents the printed product 400, the printed product 401, and the printed product 402.

In the display example 1500, delivery related information 1503 is displayed being overlaid on the printed product 400. The delivery related information according to the present exemplary embodiment includes the total number of plurality of printed products to be delivered to the same delivery destination, and an index indicating the order of the corresponding printed product in the image capturing sequence, among the plurality of printed products. More specifically, "1/2" displayed being overlaid on the printed product 400 indicates that the number of printed products to be delivered to the same delivery destination including the printed product 400 is two, and that the printed product 400 is the first one in the image capturing sequence.

In the display example 1501, the printed product 401 is displayed in addition to the printed product 400. Delivery related information 1504 is displayed being overlaid on the printed product 401. In the display example 1502, the printed product 402 is displayed in addition to the printed product 400 and the printed product 401. Delivery related information is displayed on the printed products 400 to 402. The printed product 401 and the printed product 402 are ordered in the same order and shipped to the same delivery destination. Thus, in the present exemplary embodiment, contours of the printed product 401 and the printed product 402 are emphasized for display as illustrated in the figure so that a user can easily recognize that the products are to be shipped to the same delivery destination. Another display mode may also be employed to notify the user that printed products are to be shipped to the same delivery destination. For example, the printed products may be color-coded in such a manner that the products to be shipped to the same delivery destination is colored with the same color.

According to the present exemplary embodiment described above, in a shipping operation location, an image of the predetermined image capturing area where printed products to be shipped are sequentially placed is captured, a printed product newly placed is identified based on the captured image, and the delivery destination corresponding to the printed product thus identified is acquired from the table illustrated in FIG. 7. Thus, an image of a printed product placed next can be captured with the printed product the image of which has been captured remaining placed in the image capturing area. Thus, the printed product the image of which has been captured does not need to be temporarily put aside. Furthermore, a statement of delivery and a delivery slip corresponding to the print product can be appropriately printed without attaching identification information such as a barcode to the product.

In the present exemplary embodiment, when a new printed product is placed in the predetermined image capturing area, the similar image search is executed only for the new printed product. Thus, the similar image search does not require excessively long time to be executed.

In the present exemplary embodiment, whether the printed products the images of which have been captured overlap each other is determined. When the printed products overlap each other, the mask processing is executed on the captured image as appropriate. Thus, the print operator can place a printed product in the printed image capturing area without caring about how the printed products are placed, for example, without caring about overlapping of the printed products.

In the present exemplary embodiment, as illustrated in FIG. 14, the captured image of the printed products is displayed on the display device, and the delivery related information is displayed in an overlaid manner. Thus, the print operator can recognize how many printed products which are to be delivered to the same delivery destination have been processed. The printed products to be shipped to the same delivery destination are displayed being emphasized in the same display mode. Thus, even when a plurality of printed products is to be shipped to the same delivery destination, the print operator does not need to take time and effort to search for the printed products to be shipped to the same delivery destination. Therefore, the print operator does not need to pick up products to be shipped while checking a list in which the name and the quantity of the products to be shipped are associated with each other, in a product packing operation, which is required in the case of a technique discussed in Japanese Patent Application Laid-Open No. 11-079327.

As described above, with the present exemplary embodiment, no identification information such as a barcode does not need to be attached to a printed product, so that an efficient shipping operation can be achieved. Thus, a work load of an operator can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-169742, filed Aug. 31, 2016, which is hereby incorporated by reference herein in its entirety.

What is claimed is:

1. An information processing device configured to generate print data for a slip corresponding to a printed product generated based on an order, the information processing device comprising:
   a memory configured to store a table in which image data indicating an image formed on the printed product corresponding to the order and slip information indicating a content of the slip corresponding to the order are stored in association with each other; and
   a processor for executing a computer program to perform:
      extracting a partial area corresponding to a newly placed printed product from a captured image as a result of capturing an image of a predetermined image capturing area in which the printed product is placed;
      acquiring, from the table, the slip information corresponding to image data obtained by similar image search executed to search the table for image data representing an image that matches or is similar to an image in the partial area; and
      generating print data of a slip corresponding to the newly placed printed product based on the acquired slip information.

2. The information processing device according to claim 1, wherein the processor further performs:
   generating, upon receiving the order, image data representing an image to be formed on the printed product corresponding to the order, based on the print data of the printed product; and
   storing the generated image data and the slip information corresponding to the order, in the table in association with each other.

3. The information processing device according to claim 1,
   wherein the processor further performs image capturing on the predetermined, image capturing area by controlling an image capturing device, and
   wherein when the new printed product is placed in the predetermined, image capturing area, the image capturing is executed in response to an instruction from an operator, and a partial area corresponding to the new printed product is extracted.

4. The information processing device according to claim 3,
   wherein the acquiring includes extracting a partial area including a partial area in a previous captured image, from a current captured image,
   wherein when a number of feature points showing same feature values among feature points included in each partial area, is equal to or larger than a threshold, mask processing is executed to mask an area in the partial area of the current captured image which has a same pixel position and a same pixel value as the partial area of the previous captured image,
   wherein an area not masked by the masking processing is identified as a partial area corresponding to the new printed product, and
   wherein the similar image search is executed using an image in the determined partial area.

5. The information processing device according to claim 4,
   wherein the acquiring includes extracting the partial area including the partial area in the previous captured image, from the current captured image,
   wherein when the number of feature points showing the same feature values, among feature points included in each partial area, is smaller than the threshold, the mask processing is not executed.

6. The information processing device according to claim 3,
   wherein the processor further performs causing a display device to display a captured image of the predetermined image capturing area;
   wherein, when a plurality of printed products related to the order is delivered to a same delivery destination, information indicating an order of the printed product in an image capturing sequence among the plurality of printed products, is displayed together with a total number of the printed products to be delivered to the same delivery destination, in an overlaid manner, in a partial area corresponding to the printed products.

7. The information processing device according to claim 6, wherein each printed product to be delivered to the same delivery destination is emphasized on the display in a same display mode.

8. An information processing method for generating print data of a slip corresponding to a printed product generated based on an order, the information processing method comprising:
   extracting a partial area corresponding to a newly placed printed product, from a captured image as a result of capturing an image of a predetermined image capturing area in which the printed product is placed;
   executing similar image search in which a table that stores image data indicating an image formed on the printed product corresponding to the order, and slip information indicating a content of the slip corresponding to the order in association with each other, is searched for image data representing an image that matches or is similar to an image in the partial area;
   acquiring from the table, the slip information corresponding to the image data obtained by the similar image search; and
   generating print data of a slip corresponding to the newly placed printed product based on the acquired slip information.

9. A non-transitory computer readable storage medium storing a program for causing a computer to perform:
   extracting a partial area corresponding to a newly placed printed product, from a captured image as a result of capturing an image of a predetermined image capturing area in which a printed product generated based on an order is placed;
   executing similar image search in which a table that stores image data indicating an image formed on the printed product corresponding to the order, and slip information indicating a content of the slip corresponding to the order in association with each other, is searched for image data representing an image that matches or is similar to an image in the partial area;
   acquiring from the table, the slip information corresponding to the image data obtained by the similar image search; and
   generating print data of a slip corresponding to the newly placed printed product based on the acquired slip information.

* * * * *